(12) United States Patent
Otten

(10) Patent No.: US 12,319,110 B2
(45) Date of Patent: *Jun. 3, 2025

(54) ARB DISCONNECT SYSTEM WITH IMPROVED ROLL GRADIENT AND UNDERSTEER CHARACTERISTICS

(71) Applicant: FORD GLOBAL TECHNOLOGIES, LLC, Dearborn, MI (US)

(72) Inventor: Erik Otten, Victoria (AU)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/763,384

(22) Filed: Jul. 3, 2024

(65) Prior Publication Data

US 2024/0351393 A1    Oct. 24, 2024

Related U.S. Application Data

(63) Continuation of application No. 18/249,183, filed as application No. PCT/US2020/056471 on Oct. 20, 2020, now Pat. No. 12,054,029.

(51) Int. Cl.
*B60G 21/055*    (2006.01)

(52) U.S. Cl.
CPC .... *B60G 21/0556* (2013.01); *B60G 2200/144* (2013.01); *B60G 2200/4622* (2013.01);
(Continued)

(58) Field of Classification Search
CPC .............. B60G 21/055; B60G 21/0556; B60G 2200/144; B60G 2200/462;
(Continued)

(56) References Cited

U.S. PATENT DOCUMENTS

| | | | |
|---|---|---|---|
| 7,429,054 B1 * | 9/2008 | Turner ................ | B60G 11/181 280/124.128 |
| 9,452,657 B1 | 9/2016 | Giaier | |

(Continued)

FOREIGN PATENT DOCUMENTS

| | | | | |
|---|---|---|---|---|
| EP | 2311670 B1 | | 8/2012 | |
| JP | 4424104 B2 * | | 3/2010 | .............. B60G 7/02 |
| KR | 20150077925 A * | | 7/2015 | |

*Primary Examiner* — Jason D Shanske
*Assistant Examiner* — Daniel M. Keck
(74) *Attorney, Agent, or Firm* — Burr & Forman LLP; Lorne Forsythe

(57) ABSTRACT

A suspension assembly for a vehicle suspension system may include a lower control arm, an upper control arm, a damper, and a drop link. The lower control arm may be operably coupled to a chassis of a vehicle via a first bushing assembly and a second bushing assembly. The first and second bushing assemblies may each pivot about an axis substantially parallel to a longitudinal centerline of the vehicle. The upper control arm may be operably coupled to the chassis. The damper may be operably coupled to the lower control arm to dampen pivoting motion of the upper and lower control arms relative to the chassis. The drop link may operably couple the lower control arm and an anti-roll bar that includes a disconnect assembly to translate a roll motion into a force exerted on the lower control arm in a direction substantially parallel to the axis.

20 Claims, 9 Drawing Sheets

(52) U.S. Cl.
CPC ............. *B60G 2202/1351* (2013.01); *B60G 2204/1224* (2013.01); *B60G 2204/41* (2013.01); *B60G 2800/246* (2013.01)

(58) Field of Classification Search
CPC ...... B60G 2200/4622; B60G 2202/135; B60G 2202/1351; B60G 2204/1224; B60G 2204/41; B60G 2204/4106; B60G 2500/22; B60G 2500/42; B60G 2800/24; B60G 2800/244; B60G 2800/246; B60G 2800/91; B60G 2800/9122
See application file for complete search history.

(56) References Cited

U.S. PATENT DOCUMENTS

| | | |
|---|---|---|
| 2005/0077696 A1 | 4/2005 | Ogawa |
| 2005/0253350 A1 | 11/2005 | Suchta |
| 2006/0012142 A1 | 1/2006 | Satou |
| 2015/0224845 A1 | 8/2015 | Anderson |
| 2017/0210193 A1 | 7/2017 | Saeger |
| 2020/0376918 A1 | 12/2020 | Romelhardt |
| 2022/0250430 A1 | 8/2022 | Kolp |
| 2023/0406055 A1 | 12/2023 | Foley |
| 2024/0116351 A1* | 4/2024 | Gurski .................. B60K 1/00 |

* cited by examiner

ARB DISCONNECT SYSTEM WITH IMPROVED ROLL GRADIENT AND UNDERSTEER CHARACTERISTICS

CROSS-REFERENCE TO RELATED APPLICATIONS

This application is a continuation of U.S. patent application Ser. No. 18/249,183 filed Apr. 14, 2023, which is a U.S. national stage entry of International Application No. PCT/US2020/056471 filed Oct. 20, 2020; and claims the benefit of the earlier filing date. U.S. patent application Ser. No. 18/249,183 and International Application No. PCT/US2020/056471 are incorporated herein by reference in their entirety.

TECHNICAL FIELD

Example embodiments generally relate to vehicle suspension and, more particularly, relate to a suspension system that employs an anti-roll bar (ARB) disconnect system with improved suspension kinematics and compliance characteristics.

BACKGROUND

Off-road and on-road performance targets are often difficult to meet with conventional suspension systems. In this regard, for example, soft suspension with high axle articulation is desirable at low speeds for off-road driving, but high roll-stiffness to reduce roll gain of the vehicle and improve handling is desirable for on-road driving. Additionally, high levels of understeer are required to achieve low yaw response at high speeds, whereas high yaw gains are preferred at low speeds. Given that the suspension characteristics desired for off-road and on-road driving may be contradictory, the provision of desirable characteristics for both on-road and off-road driving is a significant challenge.

One way this challenge is often dealt with is by providing an anti-roll bar (ARB) disconnect system. The ARB disconnect system allows an ARB to provide a high degree of roll-stiffness when connected, but improves axle articulation when disconnected. However, when an ARB disconnect system is applied to an independent front suspension (IFS), the lower roll gradient may significantly reduce the understeer gradient of the vehicle since an IFS often relies on the roll understeer of the suspension system to generate the understeer budget instead of relying on an undesirable upstream steering compliance that is typically used on recirculating ball steering systems that are typically found on off-road vehicles with a solid front axle.

Accordingly, even the application of a typical ARB disconnect system drives an undesirable tradeoff in which the stiffer you make the ARB, the lower the understeer gradient becomes. Thus, there remains a need to improve suspension designs to provide improved responsiveness to different driving conditions to maintain high degrees of driver confidence and enjoyment of the driving experience.

BRIEF SUMMARY OF SOME EXAMPLES

In accordance with an example embodiment, a suspension assembly for a vehicle suspension system may be provided. The suspension assembly may include a lower control arm, an upper control arm, a damper, and a drop link. The lower control arm may be operably coupled to a chassis of a vehicle via a first bushing assembly and a second bushing assembly. The first and second bushing assemblies may each pivot about an axis substantially parallel to a longitudinal centerline of the vehicle. The upper control arm may be operably coupled to the chassis. The damper may be operably coupled to the lower control arm to dampen pivoting motion of the upper and lower control arms relative to the chassis. The drop link may operably couple the lower control arm and an anti-roll bar that includes a disconnect assembly to translate a roll motion into a force exerted on the lower control arm in a direction substantially parallel to the axis.

In another example embodiment, a vehicle suspension system may be provided. The vehicle suspension system may include a first suspension assembly associated with a first front wheel of a vehicle, a second suspension assembly associated with a second front wheel of the vehicle, an anti-roll bar assembly and a motion transfer assembly. The anti-roll bar assembly may include an anti-roll bar and an anti-roll bar disconnect assembly. The anti-roll bar assembly may be operably coupled to each of the first and second suspension assemblies. The motion transfer assembly may be disposed in each of the first and second suspension assemblies. The motion transfer assembly may be arranged in to provide an inversely proportional relationship between roll gradient and understeer gradient for the vehicle suspension system.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
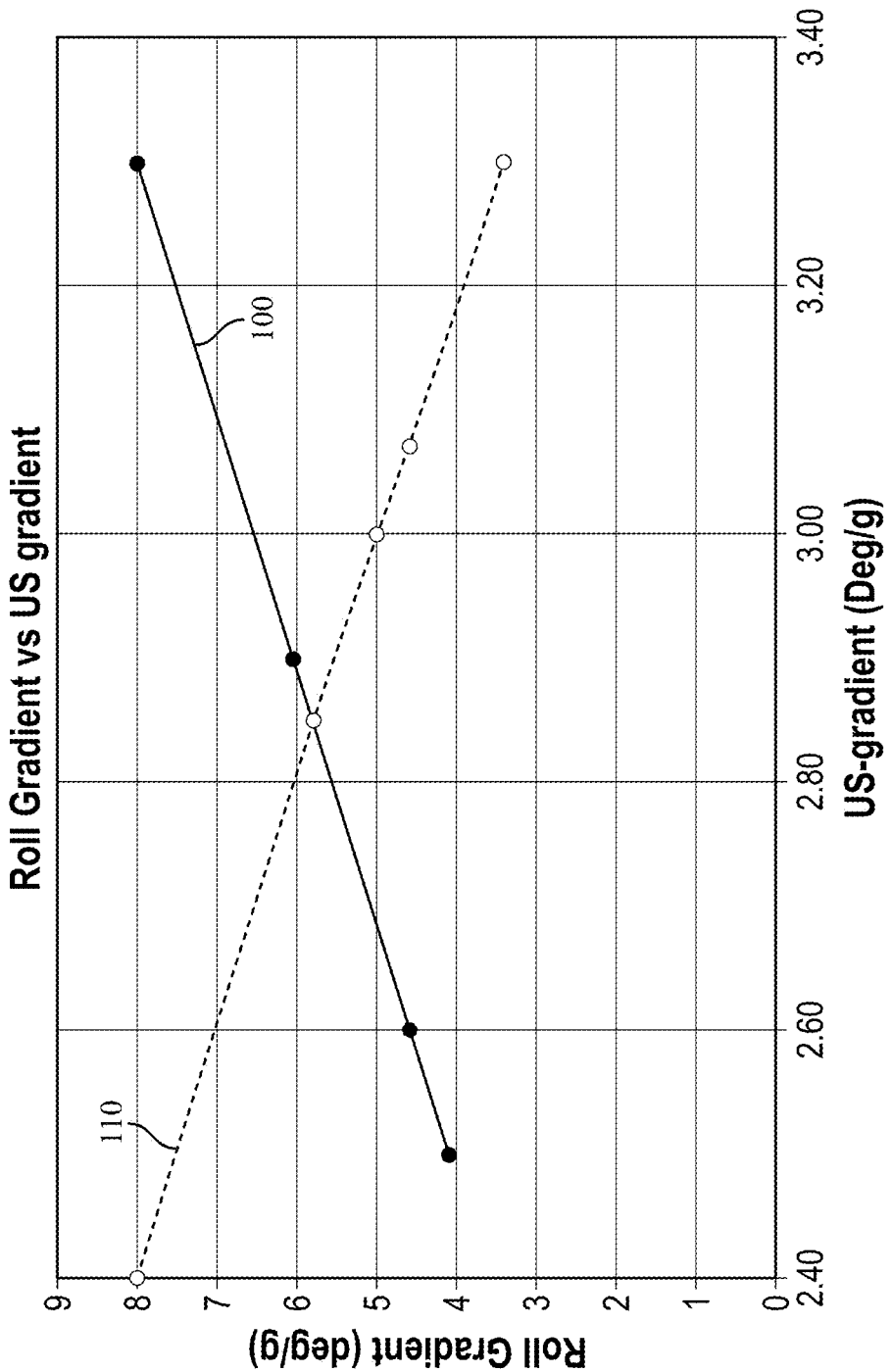
FIG. 1 illustrates a plot of roll gradient versus understeer gradient for a conventional suspension system and a suspension system employing a motion transfer assembly of an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, understeer gradient is typically traded off with roll gradient in such a way that the stiffer you make the ARB, the lower the understeer gradient will be. This typical response is demonstrated in FIG. 1 by curve 100. In this regard, curve 100 shows the normal relationship between roll gradient and understeer gradient for a conventional ARB disconnect system. As shown by curve 100, as roll gradient increases (i.e., stiffness decreases) understeer (US) gradient increases. As such, roll gradient and understeer gradient are typically directly proportional to one another.

Meanwhile, example embodiments employ a motion translation assembly that is strategically located in the suspension system in order to increase understeer gradient as roll gradient decreases (i.e., stiffness increases). Accordingly, example embodiments may provide an opposite relationship between roll gradient and understeer gradient than that which is typically provided by conventional systems. In this regard, example embodiments may employ a drop link, as part of the motion translation assembly, that is configured to provide an inverse proportionality between roll gradient and understeer gradient. This relationship is shown by curve 110 in FIG. 1.

Generally preferred performance capabilities for off road driving include low roll stiffness, high yaw gain, and low understeer gradient. Meanwhile, generally preferred performance capabilities for on road driving include high roll stiffness, low yaw gain, and high understeer gradient. Providing the preferred performance capabilities for both on road and off road situations has generally not been possible due to the normal proportionality between roll gradient and understeer gradient that exists with conventional suspension systems. In order to attempt to achieve improvements for a vehicle relative to on-road and off-road performance targets, an ARB disconnect system may be employed. However, when an ARB disconnect system is applied to an independent front suspension (IFS), the lower roll gradient significantly reduces the understeer gradient since the vehicle typically relies on the roll understeer of the suspension system to generate the understeer budget instead of relying on an undesirable upstream steering compliance that would typically be used on recirculating ball steering systems that are found on common off-road vehicles with a solid front axle.

Example embodiments provide preferred performance characteristics by employing a unique motion translation assembly that intelligently uses interactions of the motion translation assembly (e.g., via a unique drop link geometry) in conjunction with suspension kinematics and compliance characteristics to generate more rollsteer and ultimately higher understeer levels that improve yaw stability of the vehicle. Referring to FIG. 1, curve 110 shows a decreasing roll gradient as the understeer gradient increases, which implies that understeer gradient increases with an increase in ARB stiffness. For example, at a roll gradient of 4.6 deg/g, example embodiments may provide a understeer gradient of 3.1 deg/g. Thus, the motion translation assembly of example embodiments is capable of delivering the preferred performance capabilities for both off road and on road driving.

Figure 2:
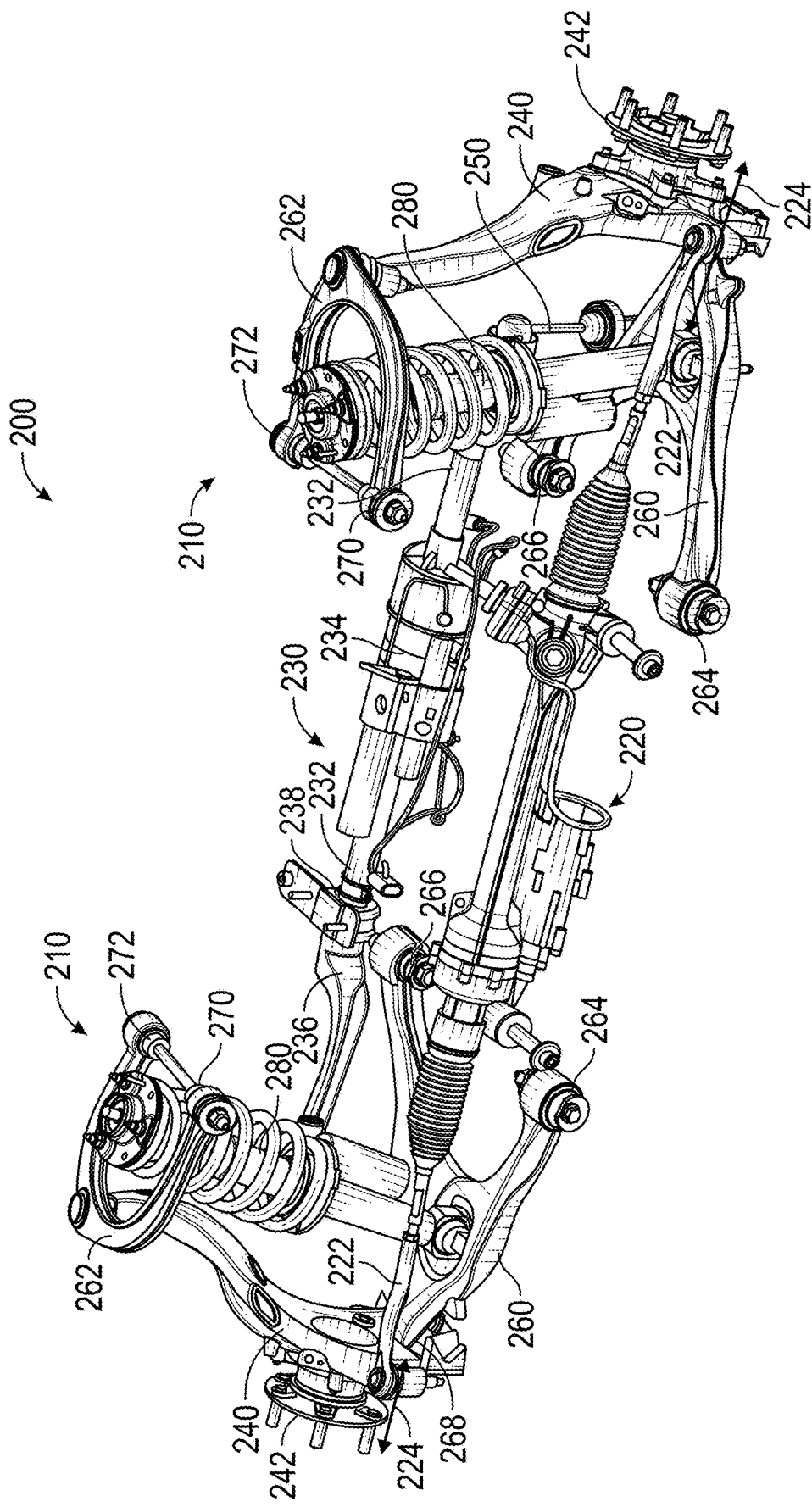
FIG. 2 illustrates a perspective view of a suspension system of a vehicle in accordance with an example embodiment.
Figure 3:
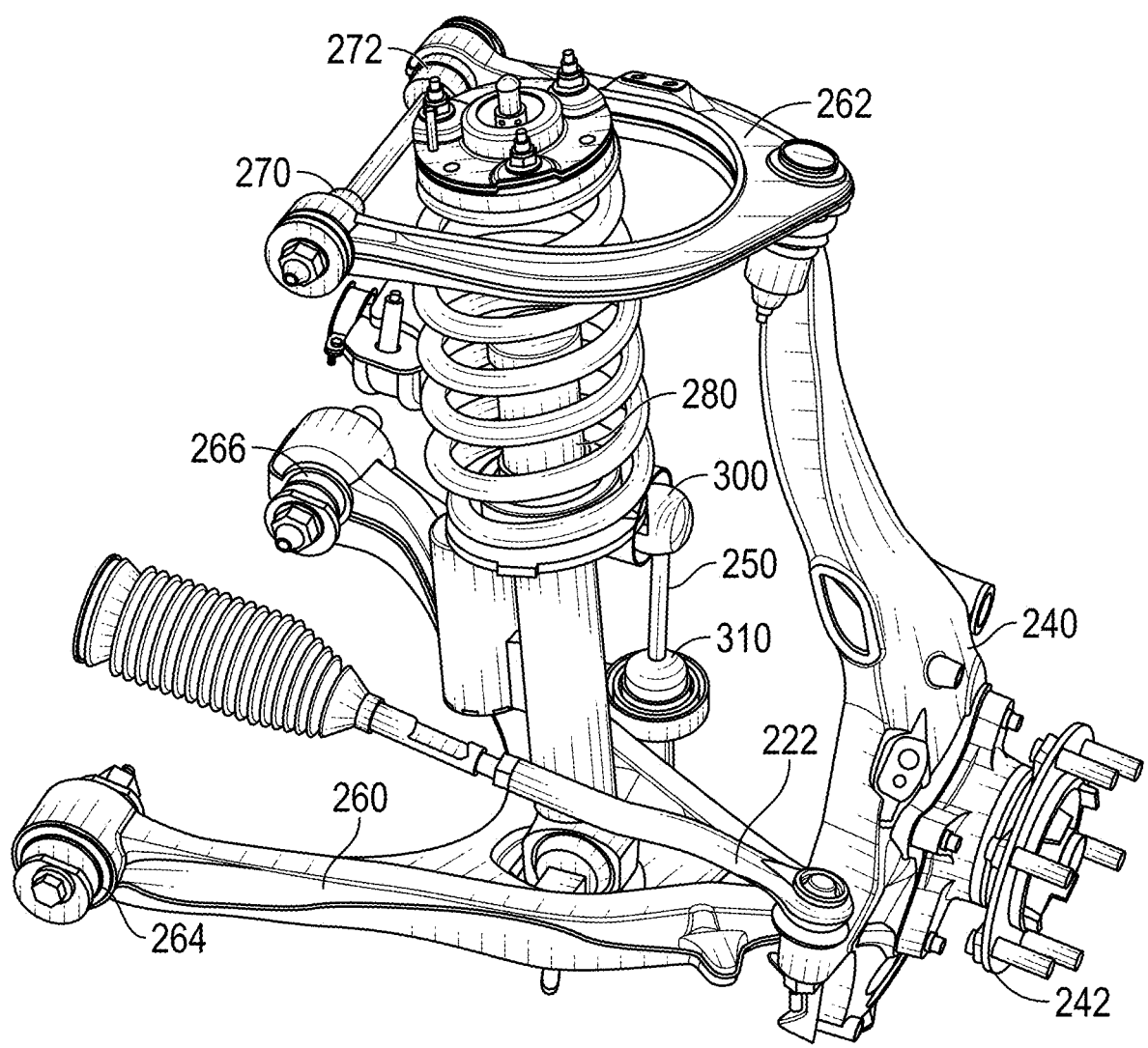
FIG. 3 illustrates a perspective view of one suspension assembly of the suspension system in accordance with an example embodiment.
Figure 4:
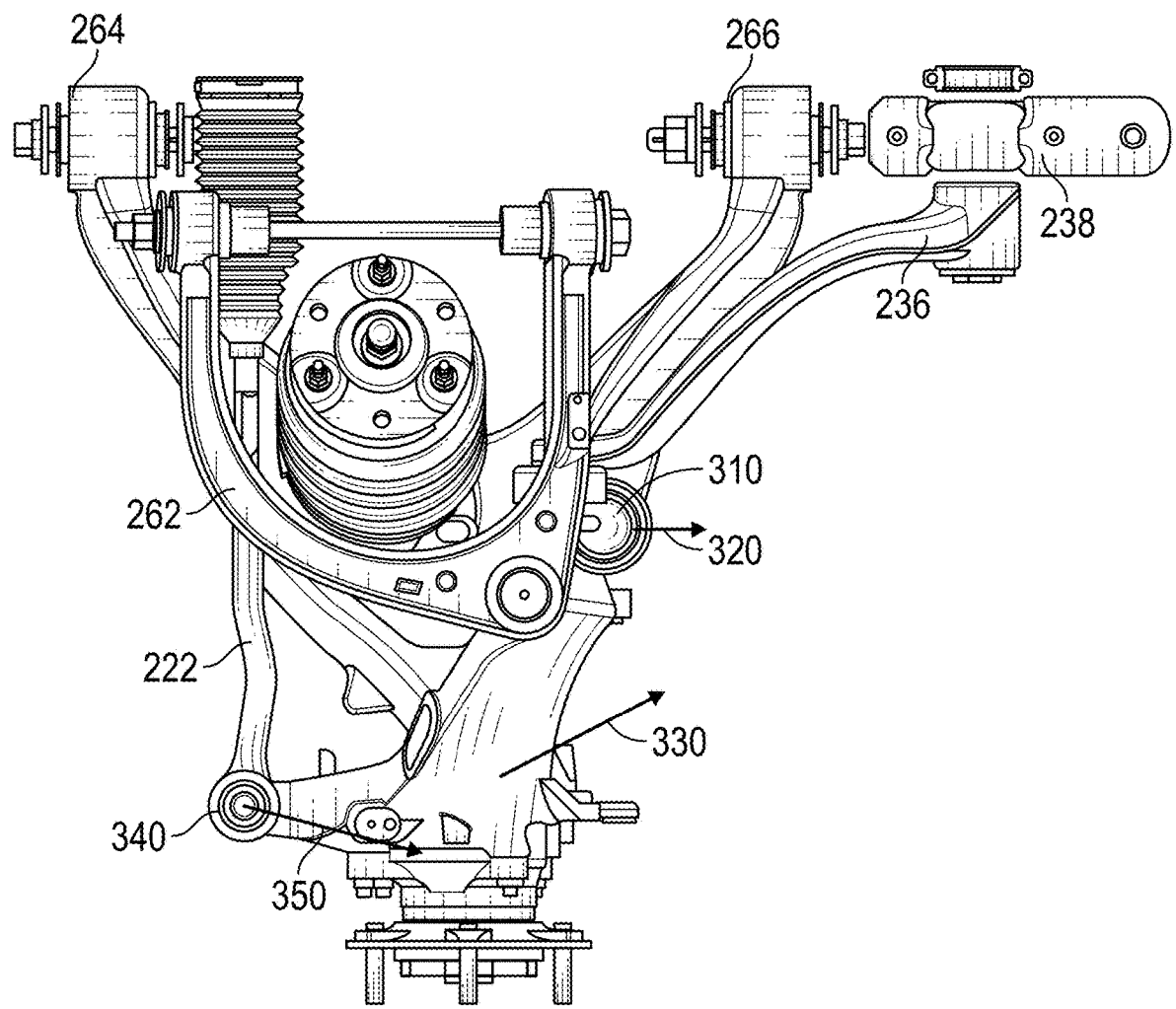
FIG. 4 illustrates a top view of the suspension system in accordance with an example embodiment.
Figure 5:
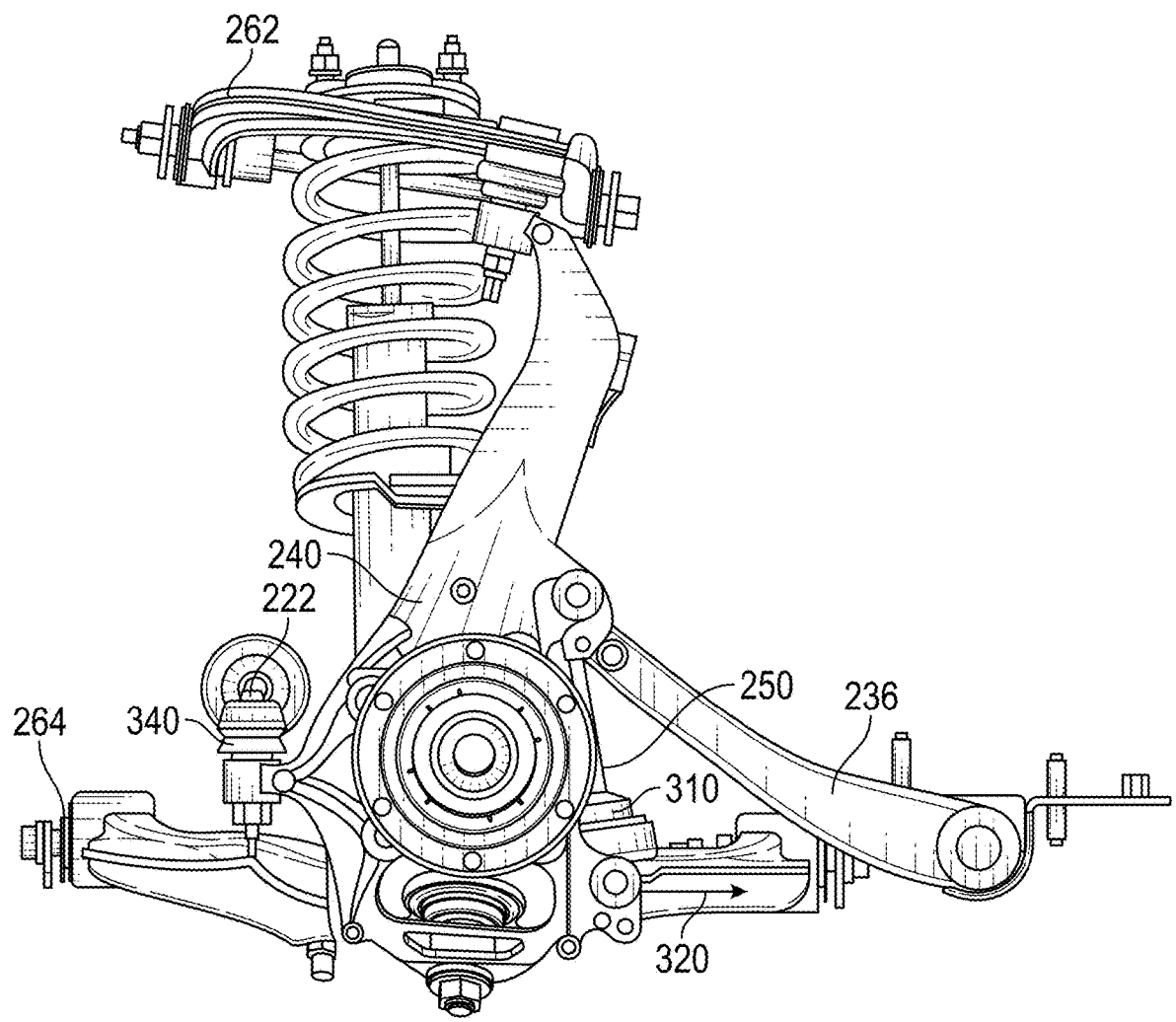
FIG. 5 illustrates a side view of the suspension system in accordance with an example embodiment.
Figure 6:
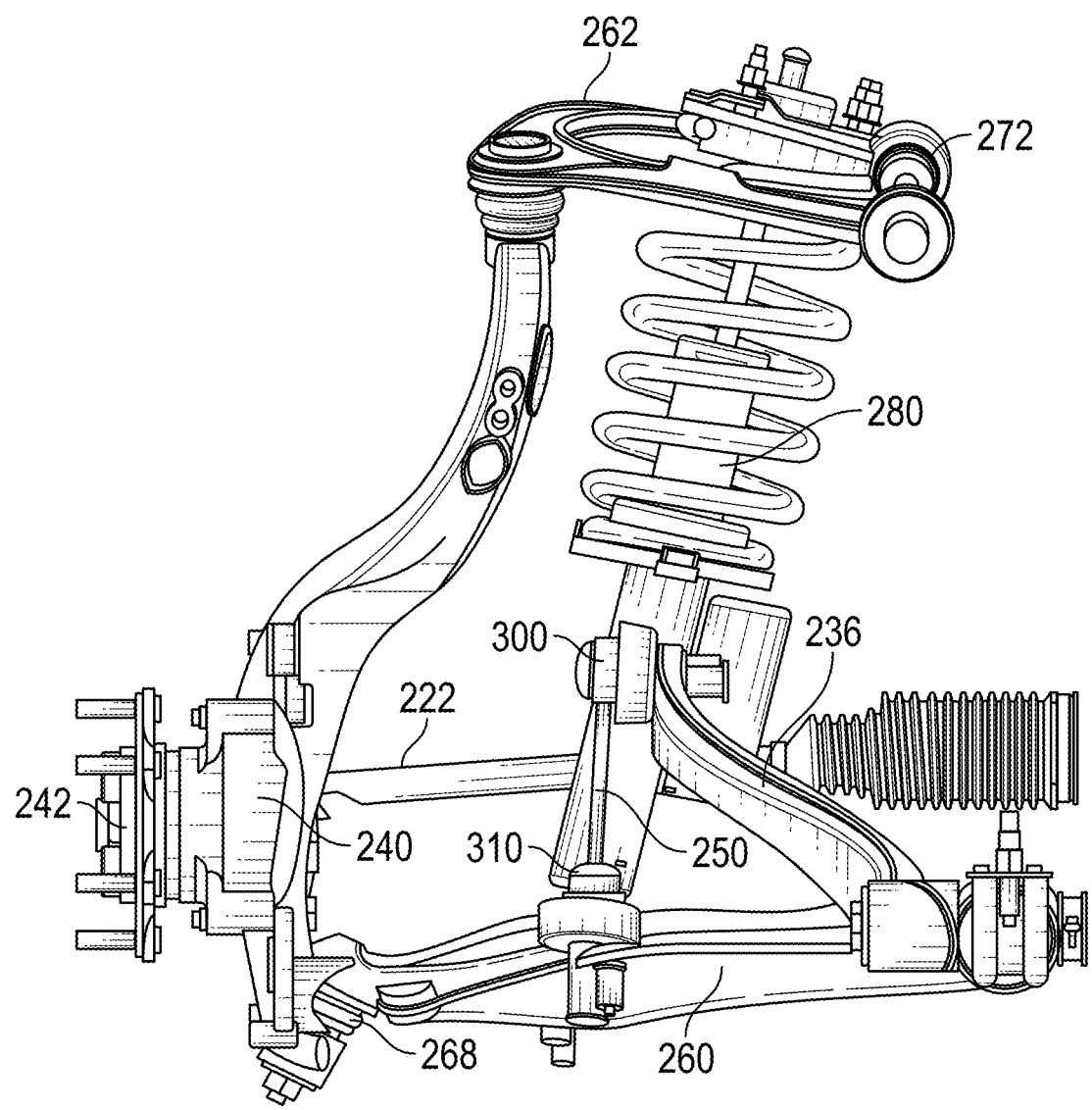
FIG. 6 illustrates a rear view of the suspension system in accordance with an example embodiment.
Figure 7:
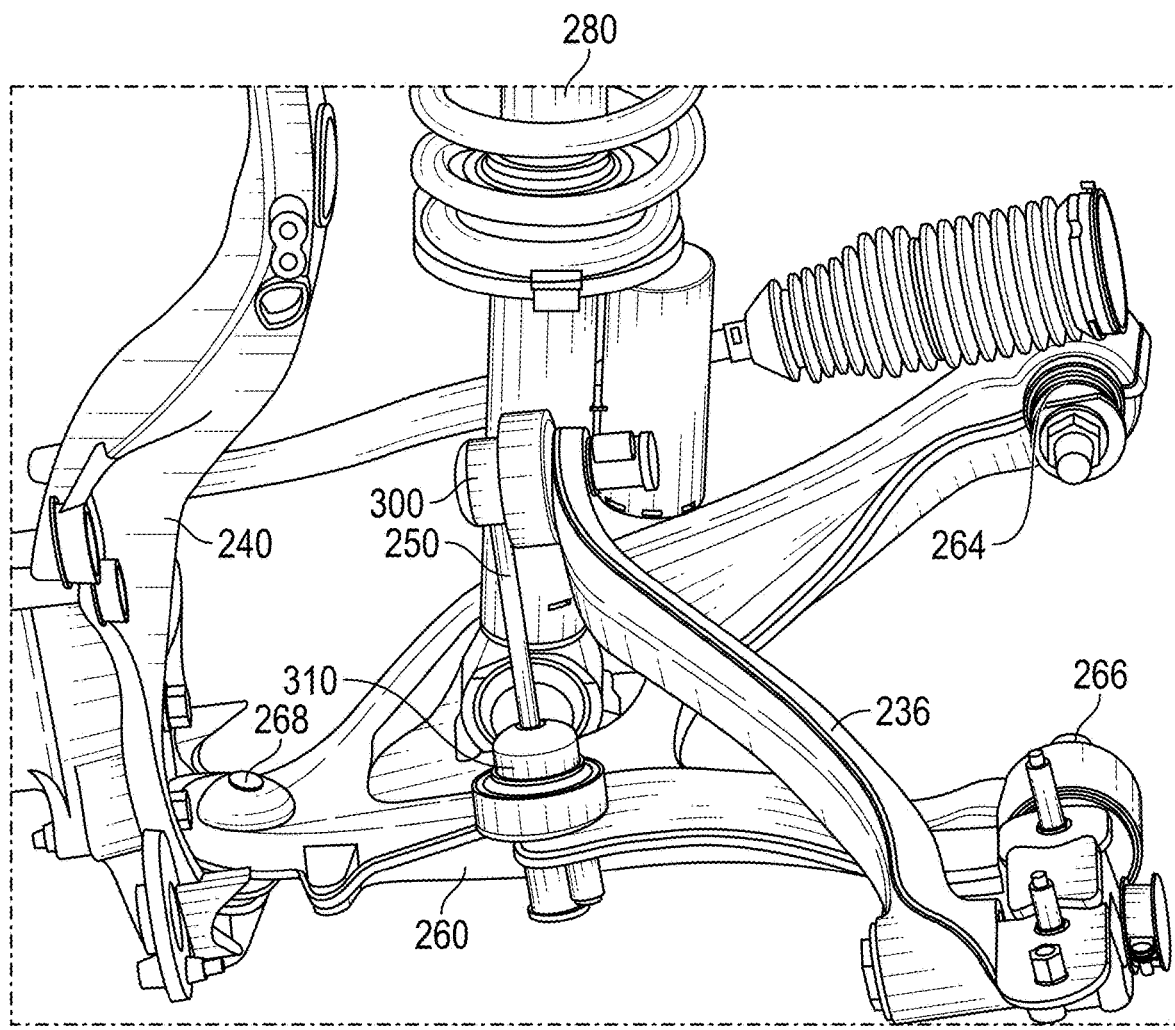
FIG. 7 illustrates a perspective view of a drop link of the suspension system in accordance with an example embodiment.
Figure 8:
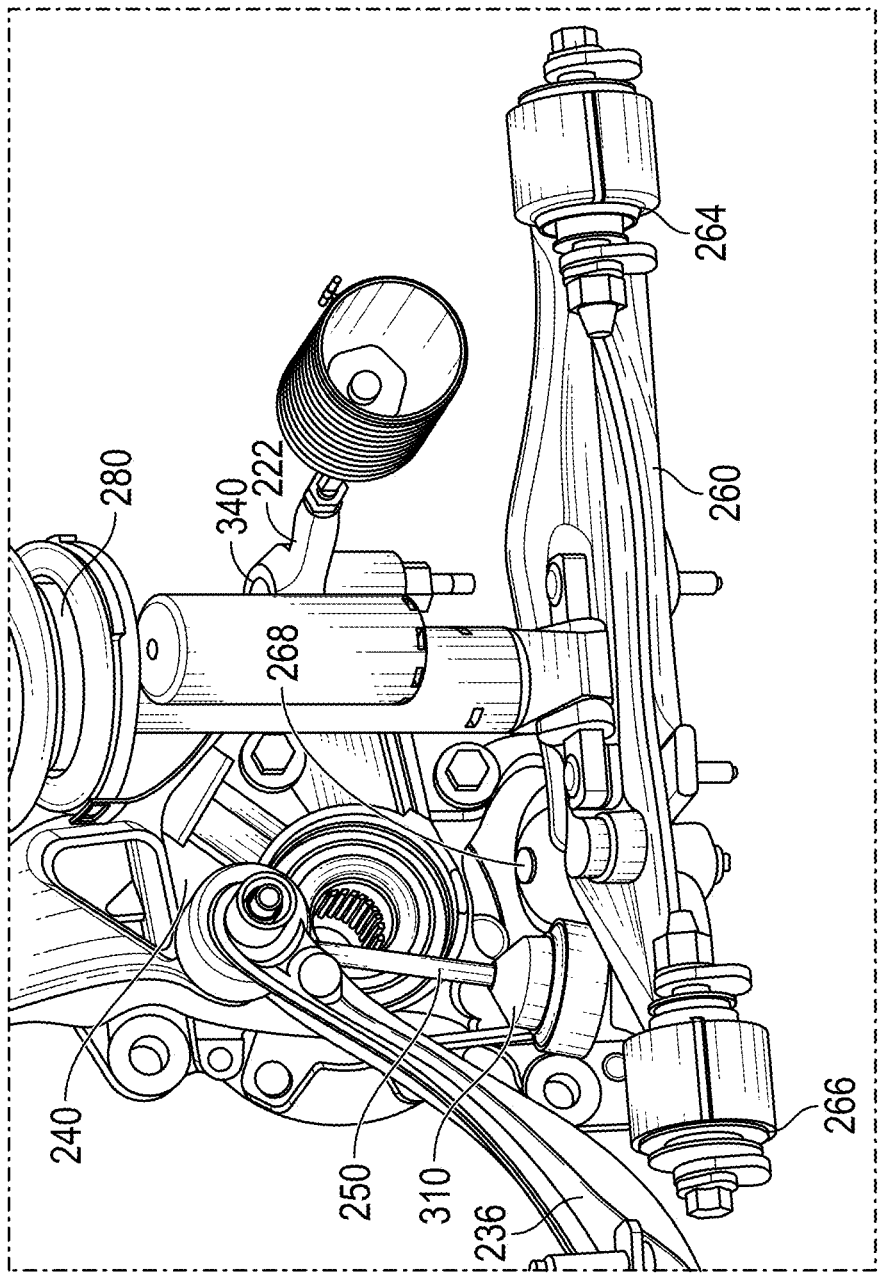
FIG. 8 illustrates a side view of the drop link of the suspension system from an interior perspective of the vehicle in accordance with an example embodiment.

FIGS. 2-8 illustrate various views of a suspension system employing a motion translation assembly of an example embodiment. In this regard, FIG. 2 illustrates a perspective view of various components of a front suspension system 200 in isolation. The suspension system 200 includes two individual suspension assemblies 210 (e.g., one for the front right wheel and one for the front left wheel). The respective individual suspension assemblies 210 are separately attached to a chassis of a vehicle, and distinct from each other. However, the individual suspension assemblies 210 may be operably coupled to each other via a steering assembly 220 and an ARB assembly 230. The steering assembly 220 may include a steering arm 222 (one on each side) that is operably coupled to a steering knuckle 240 to which a hub 242 and corresponding wheel are operably coupled. When the steering wheel is operated by the driver, inputs are provided to the steering assembly 220 to push or pull the steering knuckle 240 of each respective side and orient the steering knuckle 240 (and corresponding wheel) accordingly. Double arrow 224 shows the directions the steering arms 222 may move in to position the steering knuckle 240.

The ARB assembly 230 may include an ARB 232 that is split into two portions that are capable of being selectively linked together via operation of a disconnect assembly 234. When the disconnect assembly 234 is actuated, the two portions of the ARB 232 may be disconnected from each other. Otherwise, the two portions of the ARB 232 may be connected to each other via the disconnect assembly 234. It should be appreciated that the disconnect assembly 234 may be constructed to be either normally connected or normally disconnected, and actuation of the disconnect assembly 234 may shift the disconnect assembly 234 from its normal condition to the opposing condition accordingly.

In an example embodiment, the ARB 232 (i.e., each of the two portions thereof) may be operably coupled to an ARB link arm 236 that extends away from an axis of the ARB 232. The ARB link arm 236 may extend from a distal end of the respective portions of the ARB 232 to a drop link 250 of the motion translation assembly of an example embodiment, which will be described in greater detail below. The ARB 232 may also (e.g., proximate to the distal ends thereof) be operably coupled to the chassis via flexible bushings 238. The flexible bushings 238 allow the ARB 232 to pivot relative to the chassis so that movement initiated on one of the ARB link arms 236 is translated into a pivoting or twisting motion of the ARB 232. If the ARB 232 is not disconnected by the disconnect assembly 234, the twist of one ARB link arm 236 will be translated to a corresponding twist of the other ARB link arm 236 to tend to limit body roll of the vehicle. Notably, in some cases, the ARB link arms 236 may be integrally formed parts of the ARB 232, that extend out of the longitudinal axis of the ARB 232 instead of being separate components.

Referring now primarily to FIGS. 3-8, which show just one of the individual suspension assemblies 210, the individual suspension assembly 210 may include a first control arm 260 and a second control arm 262. The first control arm 260 may be referred to as a lower control arm or an A-arm, and may be operably coupled to the chassis of the vehicle at the distal ends of the legs of the A-arm. The first control arm 260 may also be operably coupled to a bottom portion of the steering knuckle 240 (e.g., at an apex of the A-arm). Both operable couplings may be pivotable couplings with the coupling to the chassis being provided by a first bushing assembly 264 and a second bushing assembly 266 (e.g., where the bushing assembly is understood to correspond to a bushing or collection of components configured to act as a bushing or vibration isolator that permits a certain amount of movement of parts between which the assembly is located). The first and second bushing assemblies 264 and 266 may be pivotable about an axis that extends in the forward to rearward direction (e.g., substantially parallel to a longitudinal axis of the vehicle). Meanwhile, the first control arm 260 may be connected to the steering knuckle 240 at a lower knuckle pivot joint 268 in such a way that permits the steering knuckle 240 to rotate about an axis that is substantially perpendicular to the axis about which the first and second bushing assemblies 264 and 266 pivot.

In an example embodiment, the first bushing assembly 264 may employ a stiff bushing, and the second bushing assembly 266 may employ a soft bushing. In this regard, although the stiffness need not specifically be quantified, the relative stiffness between the first bushing assembly 264 and the second bushing assembly 266 may be such that the first bushing assembly 264 is stiffer than the second bushing assembly 266. The relative stiffness of the first and second bushing assemblies 264 and 266 may contribute to operation of the motion transfer assembly of example embodiments as discussed in greater detail below.

The second control arm 262 may be disposed above the first control arm 260 (relative to the ground). The second control arm 262 may also be referred to an upper control arm, and may be operably coupled to the chassis of the vehicle at the distal ends of the legs of second control arm 262. The second control arm 262 may also be operably coupled to a top portion of the steering knuckle 240 (e.g., at an apex of the control arm). Both operable couplings may be pivotable couplings with the coupling to the chassis being provided by a third bushing assembly 270 and a fourth bushing assembly 272. The third and fourth bushing assemblies 270 and 272 may be pivotable about an axis substantially parallel to the longitudinal axis of the vehicle, and parallel to the axis about which the first and second bushing assemblies 264 and 266 pivot. The second control arm 262 may be connected to the top portion of the steering knuckle 240 is such a way that permits the steering knuckle 240 to rotate about an axis that is substantially perpendicular to the axis about which the third and fourth bushing assemblies 270 and 272 pivot.

In an example embodiment, a damper or shock absorber 280 may also be provided in each respective instance of the individual suspension assemblies 210. The shock absorber 280 may be operably coupled to the first control arm 260 at a bottom portion of the shock absorber 280. The shock absorber 280 may be operably coupled to the second control arm 262 or the chassis (directly or indirectly) at a top portion of the shock absorber 280. Thus, when encountering bumps or ruts in a driving surface, the first and second control arms 260 and 262 may allow the wheel to move up or down in relation to the chassis, while the shock absorber 280 may dampen motion of the wheel upward or downward.

These general responses to normal suspension cycles, and the existence of the ARB 232 may be expected, under normal circumstances, to produce the response shown by curve 100 in FIG. 1. However, as noted above, example embodiments employ the motion transition assembly, which is embodied by or otherwise includes the drop link 250, and the particular way the drop link 250 is employed in the individual suspension assemblies 210, will instead cause the response shown by curve 110.

As shown in FIGS. 3-8, the drop link 250 is operably coupled to a distal end (relative to the ARB 232) of the ARB link arm 236. In an example embodiment, a first ball joint 300 may be provided at a top portion (or top end) of the drop link 250 to operably couple the ARB link arm 236 to the drop link 250. A second ball joint 310 may be provided at bottom portion (or bottom end) of the drop link 250. The second ball joint 310 may be disposed at the first control arm 260 in between the apex and the distal end of the first control arm 260 (e.g., between the first bushing assembly 264 and the point at which the first control arm 260 couples to the steering knuckle 240).

The first and second ball joints 300 and 310 may allow the drop link 250 to transfer forces between the ARB link arm 236 and the first control arm 260 during various movements of the wheels as terrain is traversed and the suspension system 200 responds accordingly. The positioning of the drop link 250 and the corresponding way that forces are transferred within the individual suspension assemblies 210 provides the response shown by curve 110. In this regard, for example, the orientation of the drop link 250 and the fact that the first bushing assembly 264 is stiffer than the second bushing assembly 266 may contribute to these respective components operating as parts of the motion transfer assembly of example embodiments.

In an example embodiment, if the vehicle on which the suspension system 200 is employed encounters a roll motion, the motion translation assembly will transfer the roll motion through components of the individual suspension assembly 210 in a manner that causes understeer gradient to change inversely proportional to roll gradient (as shown by curve 110 of FIG. 1). In this regard, referring primarily to FIGS. 4 and 5, which show a top and side view of the individual suspension assembly 210, respectively, the kinematic interactions associated with operation of the motion translation assembly will be described in greater detail.

When the roll motion is experienced (e.g., as a compression event), drop link 250 inserts a fore/aft force (e.g., shown by arrow 320) due to the incline angle of the drop link 250 between the first and second ball joints 300 and 310. The fore/aft force is inserted into the suspension system 200 on the first control arm 260. The first control arm 260 may (due to the stiff bushing at the first bushing assembly 264 and soft bushing at the second bushing assembly 266) tend to pivot about an axis of the first bushing assembly 264. The pivoting of the first control arm 260 about the axis of the first bushing assembly 264 will tend to urge the lower knuckle pivot joint 268 rearward and inward in the direction of arrow 330, thereby moving a wheel center of the corresponding wheel rearward. The lateral motion makes the corresponding arm of the first control arm 260 effectively shorter. Given that the first control arm 260 and the steering arm 222 are connected via the steering knuckle 240 at a knuckle/steering arm interface 340, the knuckle/steering arm interface 340 will also move backward as shown by arrow 350, during which motion the steering arm 222 will effectively be longer. This effect will increase roll steer of the suspension by causing a toe out condition.

Accordingly, the motion translation assembly is configured to force the wheel rearward in response to a roll event and cause a toe out condition adding to bump steer. In this example, the drop link 250 extends from the ARB link arm 236 rearward and downward (at an incline) to the first control arm 260. The incline forces exerted through the drop link 250 that are applied in this way cause the suspension system 200 to respond to roll motion with more understeer for a stiffer disconnect system (i.e., ARB assembly 220 having the disconnect assembly 234). This ultimately results in the inverse relationship between roll gradient and understeer gradient that is shown in curve 110 of FIG. 1.

Figure 9:
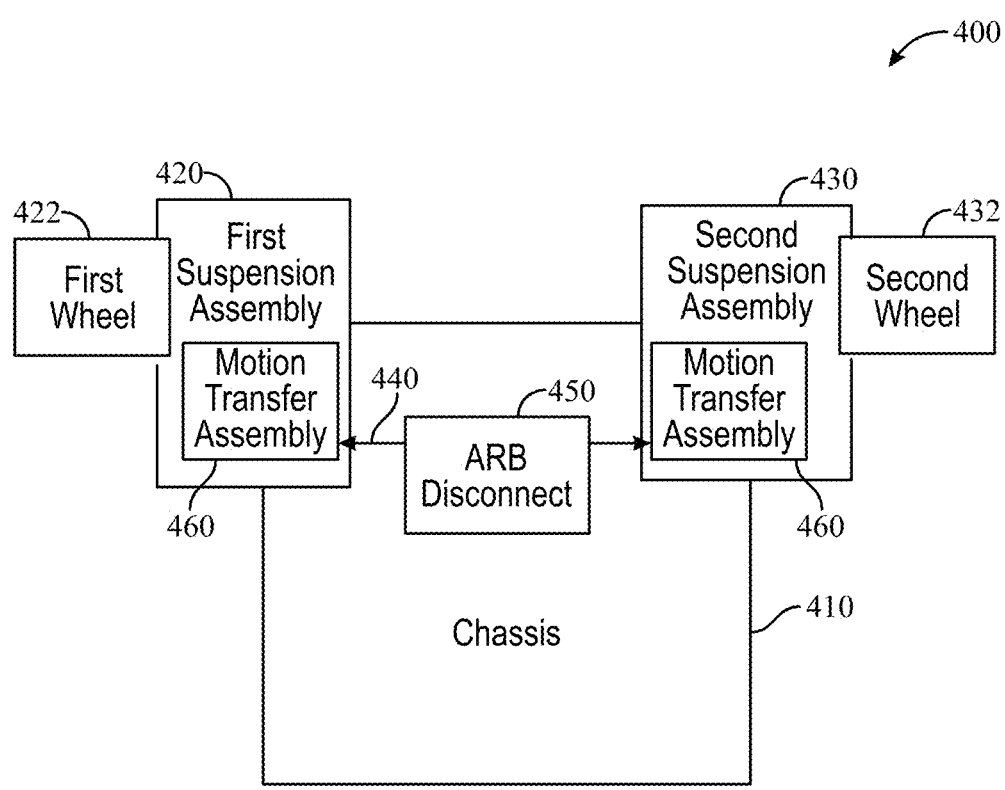
FIG. 9 is a block diagram of a vehicle employing a suspension system in accordance with an example embodiment.

FIG. 9 is a block diagram of a vehicle employing a suspension system in accordance with an example embodiment. As shown in FIG. 9, the vehicle 400 may include a chassis 410. A first suspension assembly 420 may support a first wheel 422, and a second suspension assembly 430 may support a second wheel 432. The first and second suspension assemblies 420 and 430 may substantially mirror each other in arrangement and may form portions of the suspension system of an example embodiment.

As shown in FIG. 9, the suspension system may further include an ARB 440 and an ARB disconnect assembly 450. Each of the first and second suspension assemblies 420 and 430 may include a corresponding instance of a motion transfer assembly 460. The motion transfer assembly (of each respective one of the first and second suspension assemblies 420 and 430) may be arranged or otherwise configured to provide an inversely proportional relationship between roll gradient and understeer gradient for the vehicle suspension system. In this regard, for example, the structure of FIGS. 2-8 may be used with the drop link described above in order to provide such arrangement or configuration.

Some example embodiments described herein may provide an improved suspension system that employs a motion transfer assembly that is capable of causing a toe out condition to improve understeer (and yaw gain) in a system that employs an ARB disconnect. As such, understeer gradient increases with increasing ARB stiffness and the interactions of the drop link with the other suspension components generates more roll steer and ultimately higher understeer levels required for yaw stability of the vehicle. As a result, vehicle performance and driver satisfaction may also be improved in both on-road and off-road environments.

A suspension assembly for an improved vehicle suspension system may therefore be provided. The suspension assembly may include a lower control arm, an upper control arm, a damper, and a drop link. The lower control arm may be operably coupled to a chassis of a vehicle via a first bushing assembly and a second bushing assembly. The first and second bushing assemblies may each pivot about an axis substantially parallel to a longitudinal centerline of the vehicle. The upper control arm may be operably coupled to the chassis. The damper may be operably coupled to the lower control arm to dampen pivoting motion of the upper and lower control arms relative to the chassis. The drop link may operably couple the lower control arm and an anti-roll bar that includes a disconnect assembly to translate a roll motion into a force exerted on the lower control arm in a direction substantially parallel to the axis.

The suspension assembly of some embodiments may include additional features, modifications, augmentations and/or the like to achieve further objectives or enhance performance of the assembly. The additional features, modifications, augmentations and/or the like may be added in any combination with each other. Below is a list of various additional features, modifications, and augmentations that can each be added individually or in any combination with each other. For example, the anti-roll bar may extend in a transverse direction across the vehicle. The anti-roll bar may include an anti-roll bar link arm that extends out of the transverse direction from a distal end of the anti-roll bar, and the drop link may extend from a distal end of the anti-roll bar link arm to the lower control arm. In an example embodiment, the suspension assembly may further include a steering knuckle to which a wheel of the vehicle is operably coupled. The lower control arm may be operably coupled to the steering knuckle at a pivot joint disposed at an apex of the lower control arm. The drop link may be operably coupled to the lower control arm at a location between the pivot joint and the second bushing assembly. In some cases, the drop link may be operably coupled to the anti-roll bar link arm via a first ball joint and to the lower control arm via a second ball joint. In an example embodiment, the drop link may be inclined to extend upward and forward relative to a front of the vehicle from the second ball joint to the first ball joint. In some cases, the first bushing assembly may be stiffer than the second bushing assembly. In an example embodiment, a steering arm may be operably coupled to the steering knuckle at a knuckle/steering arm interface, and, responsive to a roll event, the drop link may exert a rearward force on the lower control arm to cause the lower control arm to pivot about the axis at the first bushing assembly and initiate rearward and inward motion of the pivot joint to generate a toe out condition for the wheel to increase roll steer of the suspension assembly. In some cases, the drop link may be a portion of a motion transfer assembly that is arranged to provide an inversely proportional relationship between roll gradient and understeer gradient for the suspension assembly. In an example embodiment, the suspension assembly may be associated with a front wheel of the vehicle, and the suspension system may be part of an independent front suspension. In some cases, the drop link may be inclined to extend from the lower control arm to the an anti-roll bar upwardly, forwardly and inwardly.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A suspension assembly for a vehicle suspension system, the assembly comprising:

a lower control arm comprising a first bushing assembly and a second bushing assembly, the first and second bushing assemblies being configured to operably couple the lower control arm to a chassis of a vehicle and the first and second bushing assemblies each being configured to pivot about an axis substantially parallel to a longitudinal centerline of the vehicle;

an upper control arm configured to operably couple to the chassis; and a drop link configured to operably couple the lower control arm to an anti-roll bar that is configured to translate a roll motion into a force exerted on the lower control arm in a direction substantially parallel to the axis.

2. The suspension assembly of claim 1, wherein the anti-roll bar is configured to extend in a transverse direction across the vehicle;
wherein the anti-roll bar comprises an anti-roll bar link arm configured to extend out of the transverse direction from a distal end of the anti-roll bar; and
wherein the drop link is configured to extend from a distal end of the anti-roll bar link arm to the lower control arm.

3. The suspension assembly of claim 2, further comprising a steering knuckle configured to operably couple to a wheel of the vehicle;
wherein the lower control arm is configured to operably couple to the steering knuckle at a pivot joint disposed at an apex of the lower control arm; and
wherein the drop link is configured to operably couple to the lower control arm at a location between the pivot joint and the second bushing assembly.

4. The suspension assembly of claim 3, wherein the drop link is configured to operably couple to the anti-roll bar link arm via a first ball joint and to the lower control arm via a second ball joint.

5. The suspension assembly of claim 4, wherein the drop link is configured to extend upward and forward relative to a front of the vehicle from the second ball joint to the first ball joint on an incline.

6. The suspension assembly of claim 5, wherein a steering arm is configured to operably couple to the steering knuckle at a knuckle/steering arm interface; and
wherein, responsive to a roll event, the drop link is configured to exert a rearward force on the lower control arm to cause the lower control arm to pivot about the axis at the first bushing assembly and initiate rearward and inward motion of the pivot joint to generate a toe out condition for the wheel to increase roll steer of the suspension assembly.

7. The suspension assembly of claim 2, wherein the first bushing assembly is stiffer than the second bushing assembly.

8. The suspension assembly of claim 1, wherein the drop link is a portion of a motion transfer assembly, the motion transfer assembly being configured to provide an inversely proportional relationship between roll gradient and understeer gradient for the suspension assembly.

9. The suspension assembly of claim 8, wherein the suspension assembly is associated with a front wheel of the vehicle; and
wherein the vehicle suspension system comprises an independent front suspension.

10. The suspension assembly of claim 8, wherein the drop link is configured to extend from the lower control arm to the anti-roll bar upwardly, forwardly and inwardly on an incline.

11. A motion transfer assembly comprising:
a lower control arm configured to operably couple to a chassis of a vehicle;
an upper control arm configured to operably couple to the chassis; and
a drop link configured to operably couple the lower control arm to an anti-roll bar of the vehicle;
wherein the lower control arm, the upper control arm, and the drop link are collectively configured to operate to provide an inversely proportional relationship between roll gradient and understeer gradient for the motion transfer assembly.

12. The motion transfer assembly of claim 11, wherein the lower control arm is configured to operably couple to the chassis of the vehicle via a first bushing assembly and a second bushing assembly, the first and second bushing assemblies each being configured to pivot about an axis substantially parallel to a longitudinal centerline of the vehicle;
wherein the motion transfer assembly is configured to operably couple to a damper via the lower control arm to dampen pivoting motion of the upper and lower control arms relative to the chassis; and
wherein the motion transfer assembly comprises a drop link configured to operably couple the anti-roll bar and the lower control arm to translate a roll motion into a force exerted on the lower control arm in a direction substantially parallel to the axis.

13. The motion transfer assembly of claim 12, wherein the drop link is configured to extend from a distal end of an anti-roll bar link arm to the lower control arm.

14. The motion transfer assembly of claim 13, wherein the lower control arm is configured to operably couple to a steering knuckle at a pivot joint disposed at an apex of the lower control arm; and
wherein the drop link is configured to operably couple to the lower control arm at a location between the pivot joint and the second bushing assembly.

15. The motion transfer assembly of claim 14, wherein the drop link is configured to operably couple to the anti-roll bar link arm via a first ball joint and to the lower control arm via a second ball joint.

16. The motion transfer assembly of claim 15, wherein the drop link is configured to extend upward and forward relative to a front of the vehicle from the second ball joint to the first ball joint on an incline.

17. The motion transfer assembly of claim 16, wherein responsive to a roll event initiating the roll motion, the drop link is configured to exert a rearward force on the lower control arm to cause the lower control arm to pivot about the axis at the first bushing assembly and initiate rearward and inward motion of the pivot joint to generate a toe out condition for a wheel to increase roll steer of a suspension assembly of the vehicle.

18. The motion transfer assembly of claim 17, wherein the suspension assembly is associated with an independent front suspension.

19. The motion transfer assembly of claim 13, wherein the first bushing assembly is stiffer than the second bushing assembly.

20. The motion transfer assembly of claim 12, wherein the drop link is configured to extend from the lower control arm to the anti-roll bar upwardly, forwardly and inwardly on an incline.

* * * * *